United States Patent [19]

Flexman et al.

[11] Patent Number: 4,942,200

[45] Date of Patent: Jul. 17, 1990

[54] POLYAMIDE-POLYARYLATE COMPOSITION CONTAINING ELASTOMERIC MODIFIER AND EPOXY-FUNCTIONAL COPOLYMER

[75] Inventors: Edmund A. Flexman; James J. Sosnowski, both of Wilmington, Del.

[73] Assignee: E. I. du Pont de Nemours and Company, Wilmington, Del.

[21] Appl. No.: 165,932

[22] Filed: Mar. 9, 1988

Related U.S. Application Data

[63] Continuation-in-part of Ser. No. 52,335, May 21, 1987, abandoned.

[51] Int. Cl.$^5$ .................. C08L 67/02; C08L 77/02
[52] U.S. Cl. ................................ 525/66; 525/74; 525/133
[58] Field of Search ............... 525/166, 176, 177, 66, 525/69, 77, 78, 74, 133

[56] References Cited

U.S. PATENT DOCUMENTS

| | | | |
|---|---|---|---|
| 4,052,481 | 10/1977 | Asahara et al. | 260/857 PE |
| 4,171,330 | 10/1979 | Kyo et al. | 525/180 |
| 4,174,358 | 11/1979 | Epstein | 525/184 |
| 4,187,358 | 2/1980 | Kyo et al. | 525/190 |
| 4,206,100 | 6/1980 | Kyo et al. | 260/22 R |
| 4,584,331 | 4/1986 | Tamura et al. | 524/119 |
| 4,614,763 | 9/1986 | Trabert et al. | 525/66 |
| 4,659,757 | 4/1987 | Okamoto et al. | 524/513 |
| 4,664,983 | 5/1987 | Nakamura et al. | 524/430 |
| 4,716,202 | 12/1987 | Strauss | 525/370 |
| 4,758,629 | 7/1988 | Deyrup et al. | 525/194 |

FOREIGN PATENT DOCUMENTS

| | | |
|---|---|---|
| 106241 | 4/1984 | European Pat. Off. . |
| 0227053 | 7/1987 | European Pat. Off. . |
| 52-98765 | 8/1977 | Japan . |
| 54-141840 | 11/1979 | Japan . |
| 54-144455 | 11/1979 | Japan . |
| 56-14699 | 4/1981 | Japan . |
| 61213256 | 3/1985 | Japan . |
| 61213257 | 3/1985 | Japan . |
| 61-183353 | 8/1986 | Japan . |

*Primary Examiner*—Allan M. Lieberman
*Assistant Examiner*—Robert E. L. Sellers, II

[57] ABSTRACT

Thermoplastic compositions consisting essentially of 25–80 weight percent polyamide, 10–70 weight percent polyarylate, 0.5–30 weight percent elastomeric modifier, and 0.5–7 weight percent epoxy functional polymer, where the epoxy functional polymer and the polyarylate are preblended with each other, show unexpectedly superior resistance to high speed puncture, even as compared with the same formulation absent preblending.

21 Claims, No Drawings

POLYAMIDE-POLYARYLATE COMPOSITION CONTAINING ELASTOMERIC MODIFIER AND EPOXY-FUNCTIONAL COPOLYMER

CROSS REFERENCE TO RELATED APPLICATION

This application is a continuation-in-part of U.S. application Ser. No. 052,335, filed May 21, 1987 now abandoned.

TECHNICAL FIELD

This invention relates to certain thermoplastic polyamide-polyarylate compositions that are characterized by improved resistance to high-speed puncture. Thermoplastic polyamides include semi-crystalline and amorphous condensation products of saturated dicarboxylic acids with diamines. Useful materials of that type generally have a molecular weight of at least 5000 and are commonly referred to as nylons. Nylons have been long been known and useful in various engineering applications because of several properties characteristic of such materials, including good elongation and high energy to break as measured in tensile tests, high tensile impact strength and high energy absorbtion as demonstrated in falling dart tests. In addition polyamides possess good chemical resistance and good processing characteristics. The desire to obtain improved properties, such as reduced shrinkage and improved stiffness, has given rise to blends of polyamides with various thermoplastic materials, including polyarylates. Thermoplastic polyarylates, sometimes referred to as aromatic polyesters, are generally understood to include polymers derived from the reaction of one or more dihydric phenols with one or more aromatic dicarboxylic acids. Polyarylates possess good impact strength as measured by notched Izod tests, and various other desirable properties. However, the desire to reduce the relatively high melt viscosity and improve the processing characteristics of polyarylates has given rise to blends of polyarylates with various thermoplastic materials, including polyamides. It has been found, however, that while such polyamide-polyarylate blends do possess certain desirable properties, including improved processing characteristics, such compositions do sacrifice toughness at low temperatures as measured by standard high-speed puncture tests. Various additives can be used to enhance the resistance of such blends to high-speed puncture, however it has surprisingly been found that compositions made by blending such additives in a particular order and in particular quantities achieve superior resistance to high-speed puncture.

The compositions of the present invention are useful in preparing semi-finished and finished articles by any of the techniques commonly used with thermoplastic materials, e.g., injection molding, extrusion, blow molding, melt spinning, and stamping. Finished products made from such compositions possess extremely desirable physical properties, including high stiffness and solvent resistance, but especially high resistance to high-speed puncture.

BACKGROUND ART

Japanese Patent Publication Number 61-183353, published Aug. 16, 1986, discloses compositions comprising polyarylate/polyamide (1-70/99-30) blends that have been further blended with 0.5-50 weight percent of an alpha olefin/glycidyl alpha,beta-unsaturated carboxylate ester copolymer. Such compositions are stated to have excellent impact characteristics.

Japanese Patent Publication Number 61-213256, published Sept. 22, 1986, discloses resin compositions consisting of blends of thermoplastic polyester, aliphatic polyamide, and at least one modified polyolefin containing at least one functional radical. Such resins are stated to have high dimensional stability, sufficient crystallinity, and are strong and resilient.

Japanese Patent Publication Number 61-213257, published Sept. 22, 1986, discloses resins substantially the same as immediately above except that instead of the modified polyolefin, there is an ethylenic copolymer containing up to 10 mole percent of certain functional radicals.

Japanese Patent Publication Number 56-14699, published Apr. 6, 1981, discloses compositions comprising 100 parts by weight of certain aromatic polyesters and not more than 100 parts by weight of a polyamide. Such compositions are said to have improved mold processability, chemical resistance, low temperature resistance, and oil resistance. This publication notes that processability improves when the amount of polycaprolactam is 50% by weight or greater, but the physical properties drastically deteriorate; and that similar trends are observed with other polyamides as with polycaprolactam.

Japanese Patent Publication Number 54-144455, published Nov. 10, 1979, discloses blends of 0.1–10 parts by weight of a non-crystalline polyamide with 100 parts by weight of an aromatic polyester, which blend is said to have heat-resistant deformation, mechanical strength, transparency and improved processing properties.

Japanese Patent Publication Number 54-141840, published May 11, 1979, discloses compositions similar to that described immediately above except that the aromatic polyester contains a component derived from a trivalent alcohol. Such blends are said to have improved moldability without impairing the heat distortion resistance, mechanical properties, transparency and stress cracking resistance of the blends.

Japanese Patent Publication Number 52-98,765, published Aug. 18, 1977. discloses compositions comprising 100 parts by weight of certain aromatic polyesters and more than 100 parts by weight of a polyamide. Such compositions are said to have excellent moldability, chemical resistance and heat resistance.

U.S. Pat. No. 4,206,100, granted June 3, 1980 to Kyo et al, discloses resin compositions consisting essentially of an aromatic copolyester, a polyamide and certain metal compounds. Such compositions are said to have improved mechanical characteristics, including improved impact and brittleness at thin walled portions.

U.S. Pat. No. 4,187,358, granted Feb. 5, 1980 to Kyo et al, discloses compositions similar in identity and properties to those described immediately above, except that these contain an ionomer instead of the metal compound.

U.S. Pat. No. 4,171,330, granted Oct. 16, 1979 to Kyo et al, discloses flame retardant compositions comprising an aromatic copolyester, a polyamide, a polyalkylene phenylene ester or ester ether, and an aromatic halogen.

U.S. Pat. No. 4,052,481, granted Oct. 4, 1986 to Asahara et al, discloses compositions substantially as described immediately above except without the aromatic halogen.

None of the references listed and discussed above disclose the particular blends of the present invention, or the unexpected improvement in resistance to high-speed puncture that results when the components of the blend are combined in a certain sequence.

DISCLOSURE OF THE INVENTION

This invention relates to certain thermoplastic polyamide-polyarylate compositions that are characterized by improved resistance to high-speed puncture. More specifically, this invention comprises thermoplastic compositions consisting essentially of:

(a) 25-80 weight percent of at least one polyamide,
(b) 10-70 weight percent of at least one polyarylate,
(c) 0.5-30 weight percent of at least one elastomeric modifier, and
(d) 0.5-7 weight percent of at least one epoxy functional polymer, wherein the epoxy functional polymer and the polyarylate are blended with each other before either component is blended with either polyamide or the elastomeric modifier. The compositions of the present invention may also contain various additives as may be conventionally included in such compositions. All of the above-recited weight percents are based of the total weight of the composition.

The compositions of the present invention will include multi-phase melt blends of the above ingredients, and, since two or more of the above ingredients may react or interact with each other, the compositions of the present invention will also include melt blends of the reaction products thereof. The product of the melt mixing is complex and not well understood because each of the components is capable of reacting with any of the other components. For example, the epoxy functional polymer can react with the polyarylate via a reactive end group or through reaction of an ester group with the epoxide group. Likewise, the elastomeric modifier may react with epoxy functional polymer or the polyarylate.

The reactions between the various components of the compositions of the present invention are usually completed during the melt mixing or compounding operation. Under conditions of melt mixing which are not sufficiently intense, the reactions described above may not be completed. These blends are considered part of this invention because they remain reactive and are easily converted into a normal blend by further melt mixing step as would occur in either another extrusion step or during injection molding.

Component (a) polyamide will comprise 25-80 weight percent, preferably 30-75 weight percent, and most preferably 40-75 weight percent of the composition. Component (b) polyarylate will comprise 10-70 weight percent, preferably 15-60 weight percent, and most preferably 20-50 weight percent of the composition. Compositions containing an excessively low proportion of polyamide, or alternatively an excessively high proportion of polyarylate, will have inferior solvent resistance, elongation and toughness. Compositions containing an excessively high proportion of polyamide, or alternatively an excessively low proportion of polyarylate, will have inferior stiffness, shrinkage from the mold, and resistance to moisture absorption. Component (c) elastomeric modifier will comprise 0.5-30 weight percent, preferably 1-25 weight percent, and most preferably 2-20 weight percent of the composition. A relatively high level of elastomeric modifier will give compositions better toughness and melt strength. A relatively low level of elastomeric modifier will give compositions better modulus and higher tensile strength. Component (d) epoxy functional polymer will comprise 0.5-7 weight percent, preferably 1-6 weight percent, and most preferably 1.5-5 weight percent of the composition. High levels of epoxy functional polymer will give compositions with higher toughness, however levels too high are difficult to disperse.

The polyamides used in the compositions of the present invention include those semi-crystalline and amorphous resins having a molecular weight of at least 5000 and commonly referred to as nylons. Suitable polyamides include those described in U.S. Pat. Nos. 2,071,250; 2,071,251; 2,130,523; 2,130,948; 2,241,322; 2,312,966; 2,512,606; and 3,393,210. The polyamide resin can be produced by condensation of equimolar amounts of a dicarboxylic acid containing from 4 to 12 carbon atoms with a diamine, in which the diamine contains 4 to 14 carbon atoms. Examples of polyamides include polyhexamethylene succinamide (64nylon), polyhexamethylene adipamide (66 nylon), polyhexamethylene azelaamide (69 nylon), polyhexamethylene sebacamide (610 nylon), polyhexamethylene dodecanoamide (612 nylon), and polyamides produced by ring opening of lactams, e.g. polycaprolactam (6 nylon), polylauric lactam (12 nylon), poly-11-aminoundecanoic acid (11 nylon), and bis(paraaminocyclohexyl) methane dodecanoamide. Of these polyamides derived from lactams, 6 nylon is preferred. It is also possible in the compositions of the present invention to use polyamides prepared by the copolymerization of two or more of the above polymers or their components, e.g. an adipic, isophthalic acid hexamethylene diamine copolymer. Preferably the polyamides are semi-crystalline and linear with a melting point in excess of 200 degrees C. The most preferred polyamides for use in the compositions of the present invention are the 66 nylons. For compositions relatively low in polyamide, i.e. those containing less than about 40 weight percent polyamide, the polyamide must be nylon 66 in order to obtain the desired superior resistance to high-speed puncture.

The polyarylates used in the compositions of the present invention are aromatic polyesters derived from one or more dihydric phenols and one or more aromatic dicarboxylic acids. The dihydric phenol can be a bisphenol as described in U.S. Pat. No. 4,187,358 as structure 1:

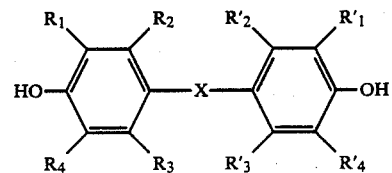

wherein -X- is selected from the group consisting of nothing, —O—, —S—, —SO$_2$—, —SO—, —CO—, an alkylene group containing 1 to 5 carbon atoms and an alkylidene group containing 2 to 7 carbon atoms, and R$_1$, R$_2$, R$_3$, R$_4$, R$_1'$, R$_2'$, R$_3'$ and R$_4'$, which may be the same or different, each is selected from the group consisting of a hydrogen atom, a chlorine atom, a bromine atom and an alkyl group containing 1 to 5 carbon atoms, and/or a functional derivative thereof.

Suitable examples of alkylene groups for X containing 1 to 5 carbon atoms include a methylene group, an ethylene group, a propylene group, a tetramethylene group and a pentamethylene group. Suitable examples of alkylidene groups for X containing 2 to 7 carbon atoms include an ethylidene group, a propylidene group, an isopropylidene group, an isobutylidene group and a pentylidene group, a cyclopentylidine group and a cyclohexylidine group.

Suitable examples of alkyl groups for $R_1$ to $R_4$ and $R_1$, to $R_4$, containing 1 to 5 carbon atoms include a methyl group, an ethyl group, an isopropyl group, a tert-butyl group and a neopentyl group.

Additionally, up to 40 mole % of dihydric aromatic phenols of the formula:

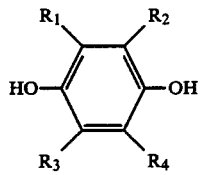

may be used in combination with the bisphenols wherein $R_1$-$R_4$ are as previously described.

Preferably, a mixture of 60 to 0 mole % of terephthalic acid and/or the functional derivatives thereof and 40 to 100 mole % of isophthalic acid and/or its functional derivatives is used as the acid component to be reacted with the bisphenol to prepare the polyarylate used in the compositions of the present invention. More preferably, a mixture of 0 to 50 mole % of terephthalic acid and/or the functional derivatives thereof and 100 to 50 mole % of isophthalic acid and/or the functional derivatives thereof is used. The molar ratio of the bisphenol to the sum of the terephthalic acid units and isophthalic acid units is substantially equimolar, e.g., about 1:0.95 to 1.2, preferably about 1:1, most preferably 1:1. Aromatic hydroxy acids such as hydroxy benzoic or hydroxy naphthoic acid and other dicarboxylic acids (both aromatic and aliphatic) can also be incorporated into the polyarylate structure as a minor component.

Examples of functional derivatives of terephthalic or isophthalic acid which can be used in this invention include acid halides and diaryl esters. Preferred examples of acid halides include terephthaloyl dichloride, isophthaloyl dichloride, terephthaloyl dibromide and isophthaloyl dibromide. Preferred examples of diaryl esters include diphenyl terephthalate and diphenyl isophthalate.

Examples of suitable bisphenols are 4,4'-dihydroxydiphenyl ether, bis(4-hydroxy-2-methylphenyl)ether, bis(4-hydroxy-3-chlorophenyl)-ether, bis(4-hydroxyphenyl)sulfide, bis(4-hydroxyphenyl)sulfone, bis(4-hydroxyphenyl)ketone, bis(4-hydroxyphenyl)methane, bis(4-hydroxy-3-methylphenyl)methane, bis(4-hydroxy-3,5-dichlorophenyl)methane, 1,1-bis(4-hydroxyphenyl)-cyclohexane, 1,1-bis(4-hydroxyphenyl)cyclopentane, 1,1-bis(4-hydroxyphenyl)cycloheptane, bis(4-hydroxy-3,5dibromophenyl)methane, 1,1-bis(4-hydroxyphenyl)ethane, 2,2-bis(4-hydroxy-3-methylphenyl)propane, 2,2-bis(4-hydroxy-3-chlorophenyl) propane, 2,2-bis(4-hydroxy-3,5-dichlorophenyl)propane, 2,2-bis(4-hydroxy-3,5-dibromophenyl)propane, 3,3,3,,3,-tetramethyl spirobis-1,1,-indane-6,6,-diol and 1,1-bis(4-hydroxyphenyl)-n-butane. 2,2-Bis(4-hydroxyphenyl)-propane is most preferred.

Typical examples of the functional derivatives of the bisphenol which can be used are the alkali metal salts and diesters with aliphatic monocarboxylic acid containing 1 to 3 carbon atoms. Suitable examples of aliphatic monocarboxylic acids include formic acid, acetic acid, propionic acid, etc. Preferred functional derivatives of the bisphenols are the sodium salts, the potassium salts, and the diacetate esters.

The bisphenol can be used either individually or as a mixture of two or more. Further, mixed salts or mixed carboxylate esters may be used.

In the preparation of the polyarylate, at most 50 mole %, preferably at most 25 mole %, of a compound having a carbonate linkage such as diphenyl carbonate or an aliphatic glycol such as ethylene glycol, propylene glycol, tetramethylene glycol or neopentyl glycol may also be copolymerized therewith to improve the molding characteristics. To change the reactivity and possibly the stability of the polyarylate, monofunctional components can be included in the polyarylate to limit molecular weight or reduce the proportions of reactive ends.

Polyarylates useful in the compositions of the present invention can be prepared by any of several known methods. The interfacial polymerization method comprises mixing a solution of an aromatic dicarboxylic acid chloride in a water-immiscible organic solvent with an alkaline aqueous solution of bisphenol. The solution polymerization method comprises heating bisphenol and a diacid dichloride in an organic solvent. One melt polymerization method comprises heating a diphenyl ester of an aromatic dicarboxylic acid and bisphenol. An alternate melt polymerization method comprises heating aromatic dicarboxylic acid and a diester (e.g., the diacetate ester) of bisphenol. These methods are described in detail in U.S. Pat. Nos. 3,884,990, 3,946,091, 4,052,481 and 4,485,230.

In order to insure good physical properties in the compositions of the present invention, the polyarylate should have a logarithmic viscosity number ($_{inh}$ or IV), defined by the following equation, of about 0.35 to about 1.5, preferably 0.40 to 0.65

$$\eta inh = \frac{\ln t_1/t_2}{C}$$

wherein $t_1$ is the falling time (in seconds) of a solution of the polyarylate, $t_2$ is the falling time (in seconds) of the solvent; and C is the concentration (g/dl) of the polyarylate in the solution. The logarithmic viscosity number used herein is determined in a trifluoroacetic acid-methylene chloride mixture (25/75 by volume) at 30° C. The procedure is further described in Textbook of Polymer Science by F. Billmeyer, p. 79 (John Wiley & Sons, 1962).

The elastomeric modifiers used in the compositions of the present invention will include those commonly used in thermoplastic compositions based on either polyamides or polyesters. For example a class of elastomeric modifiers useful in both polyamides and polyesters are disclosed in U.S. Pat. Nos. 4,174,358 and 4,172,859, the subject matter of Which is hereby incorporated by reference into the present description. Such modifiers are characterized as having adherent sites, and having a tensile modulus in the range of about 1.0 to 20,000 p.s.i., with the ratio of the tensile modulus of the matrix polyamide or polyester to the tensile modulus of the modifier being greater than 10 to 1. Such modifiers are also characterized by the general formula

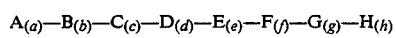

$A_{(a)}-B_{(b)}-C_{(c)}-D_{(d)}-E_{(e)}-F_{(f)}-G_{(g)}-H_{(h)}$

Such modifiers are described as branched or straight chain polymers derived in any order, e.g., random, from monomers A to H where A is ethylene;

B is CO;

C is an unsaturated monomer taken from the class consisting of alpha,beta-ethylenically unsaturated carboxylic acids having from 3 to 8 carbon atoms, and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions and dicarboxylic acids and monoesters of the dicarboxylic acid neutralized by amine-ended caprolactam oligomers having a DP of 6 to 24;

D is an unsaturated epoxide of 4 to 11 carbon atoms;

E is the residue derived by the loss of nitrogen from an aromatic sulfonyl azide substituted by carboxylic acids taken from the class consisting of monocarboxylic and dicarboxylic acids having from 7 to 12 carbon atoms and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions;

F is an unsaturated monomer taken from the class consisting of acrylate esters having from 4 to 22 carbon atoms, vinyl esters of acids having from 1 to 20 carbon atoms (substantially no residual acid), vinyl ethers of 3 to 20 carbon atoms, and vinyl and vinylidene halides, and nitriles having from 3 to 6 carbon atoms;

G is an unsaturated monomer having pendant hydrocarbon chains of 1 to 12 carbon atoms capable of being grafted with monomers having at least one reactive group of the type defined in C, D and E, and pendant aromatic groups which may have 1 to 6 substituent groups having a total of 14 carbon atoms; and H is an unsaturated monomer taken from the class consisting of branched, straight chain and cyclic compounds having from 4 to 14 carbon atoms and at least one additional nonconjugated unsaturated carbon-carbon bond capable of being grafted with a monomer having at least one reactive group of the type defined in C, D and E.

The aforementioned monomers may be present in the polymer in the following mole fraction:

(a) 0 to 0.95;
(b) 0 to 0.3;
(c) 0 to 0.5;
(d) 0 to 0.5;
(e) 0 to 0.5;
(f) 0 to 0.99;
(g) 0 to 0.99; and
(h) 0 to 0.99 so that the total of all components is a mole fraction of 1.0.

Preferred modifiers from within the general description above include EPDM rubbers grafted with functional groups, such as dicarboxylic acids or the anhydrides thereof.

The epoxy functional polymers used in the compositions of the present invention are any of those polymers which contain a plurality of oxirane moieties including polymers and copolymers prepared by polymerizing an oxirane group containing monomer and those polymers in which the oxirane function is introduced subsequent to formation of the polymer chains as, for example, by epoxidation of pendant or main chain double bonds. The latter include epoxidized products of polymers such as polybutadiene or poly(styrene butadiene) or their partially hydrogenated derivatives. It also includes the epoxidized derivatives of EPDM rubbers.

The preferred epoxy functional polymer prepared by polymerization of an oxirane-containing monomer is a copolymer as described below and may include more than one monomer within each of the three classes:

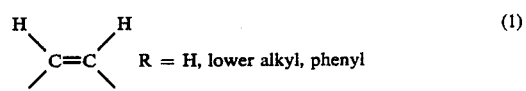

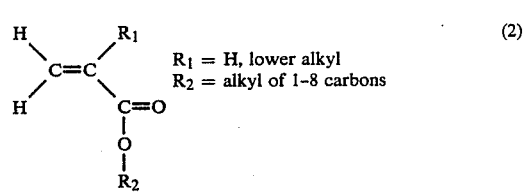

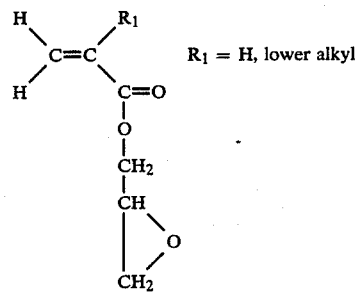

comprising 99.5 to 0 wt. % (1), 0 to 99.5 wt. % (2) and 0.4 to 15 wt. % (3). Minor amounts of other monomers may also be present.

More preferably, the epoxy functional polymer is a copolymer of ethylene, 0–40% alkyl(meth)acrylate, 0.7–7% glycidyl methacrylate. Most preferably, the epoxy functional polymer is a copolymer of ethylene, with 0–30% n-butyl acrylate and 1–5% glycidyl methacrylate (GMA). The GMA level of these epoxy functional polymers expressed as an epoxy number in milliequivalent of epoxide per gram of resin (meq/g) should be 0.025–1.06 meq/g, preferably 0.0704–0.493 meq/g, and most preferably 0.0704–0.352 meq/g. When the acrylate is n-butyl acrylate, this most preferred range corresponds to 1–5% GMA.

The above polymers optionally may also contain vinyl acetate, carbon monoxide or sulfur dioxide.

The melt index (ASTM D-1238, condition E) of the epoxy containing polymer may vary from 0.5 to 50, preferably from 5 to 20.

Other additives as are known to those familiar with polymer compounding may be included in the composition. These additives include stabilizers including phosphites, antioxidants, flame retardants, reinforcing agents such as glass fiber and flake, minerals, ultraviolet light stabilizers, pigments, dyes etc.

In all processing operations, it is necessary to dry the components of the thermoplastic product sufficiently to minimize unwanted hydrolytic degradation. Operating temperatures should also be selected consistent with obtaining a fluid melt but minimizing thermal degradation of the composition and its components.

The melt mixing of the components of the composition of the present invention can be carried out in any conventional extrusion apparatus equipped with side feeding capability or other apparatus which would allow mixing to be carried out sequentially. As mentioned above, it is important that the polyarylate and the epoxy functional polymer be melt blended with each other before either component is melt blended with either the polyamide or the elastomeric modifier. In addition, it is important at either the elastomeric modifier or the preblended polyarylate/epoxy containing polymer be side-fed into the extruder.

If used, a single screw extruder should be fitted with a screw that develops sufficient energy to adequately melt and mix the components. The screw may be of a single-stage design for use in an unvented barrel or of a two-stage design for use with a vented barrel. The barrel temperature settings would be selected to provide the desired melt temperature and a screw speed selected within the normal operating range of the machine, usually near the upper end of the range. The product exit the die is normally pelletized if it is to be remelted in a subsequent step.

Twin-screw extruders are preferred. The ZSK series machines made by the Werner & Pfleiderer Company are examples of suitable twin-screw machines. These machines employ two intermeshing co-rotating screws which are assembled from various elements into a suitable configuration. The selection of a screw configuration is not critical to the invention. A typical configuration will use conveying elements to convey the feed material from the feed zone to a melting zone in which the material is compressed and melting begins. A section of "kneading blocks" followed by "reverse elements" next provides high shear and pressure to further the melting and mixing processes which permit the various reactions to begin. If the extrusion is to be conducted under vacuum, the reverse elements serve also to provide a melt seal following which the melt will be decompressed in the section under vacuum. Following the vacuum zone, the screw recompresses the melt and continues the dispersion process and may optionally again pass it through kneading blocks and reverse elements which, if present, also serve as a vacuum seal for this side of the vacuum zone. The melt is then further compressed and mixed as it passes through the end of the extruder and out the die. The die may be designed to form an end use shape directly, i.e., a profile, sheet or parison, or it may produce strand for pelletizing the product. In a machine such as a Baker-Perkins, the melt from the twin-screw mixer will be discharged to a single-screw extruder or other melt pump for pelletizing or shaping.

The composition of the present invention may be processed into useful objects by the many fabricating processes known to those familiar with the art of fabricating thermoplastics. It may be formed into a useful shape directly exit the compounding extruder. Such shapes include, but are not limited to, sheets, film, rods, tubes, various profile shapes, coatings, and parisons for blow molding. These same products can, of course, also be made in the more usual manner by re-extruding pre-compounded product.

The compounded product will more typically be used to injection mold end-use objects. In this process the product of the invention in pellet form is introduced to the melting zone of a molding machine and converted to a fluid melt under the action of shear, applied heat and compression. The melt is then transferred (injected) under pressure to a mold and allowed to solidify.

The physical properties of the molded articles may depend on the manner in which it is fabricated. This is known to those skilled in the art of fabricating thermoplastics containing dispersed phases. Processing parameters such as melt temperature, mold temperature, melt flow paths, melt shear rates, mold fill times, and part thickness all influence many of the physical properties of a fabricated object. These parameters must be considered as one selects and optimizes a fabricating process to produce a desired balance of properties.

In the following examples, all parts and percentages are by weight unless specified otherwise. Two polyamides were used:
(1) Polyamide A was a medium viscosity molding grade of 66 nylon having a molecular weight of approximately 18,000.
(2) Polyamide B was a molding grade of 612 nylon having a molecular weight of approximately 20,000.

In the following examples, Polyarylate A was a polyarylate derived from 2,2,-bis(hydroxyphenyl)propane and isophthalic acid, with an I.V. of approximately 0.5.

In the following examples, five different modifiers were used. Modifiers A, B and C were ethylene polymers grafted with fumaric acid (e.g., as disclosed in U.S. Pat. No. 4,026,967) as summarized in Table 1, below:

TABLE 1

| Modifier | Modifier Composition | | |
|---|---|---|---|
| | Ethylene Polymer | Acid No. (meg/g) | Melt Index (g/10 min) |
| A | EPDM | 0.27 | 0.13 |
| B | EPDM | 0.36 | 0.20 |
| C | HDPE | 0.10 | 10.50 |

In Table 1 above, EPDM is an ethylene/propylene/1,4-hexadiene/norbornadiene (68/26/6.3/0.15) tetrapolymer, HDPE is high density polyethylene, and melt index was determined in accord with ASTM D-1238, condition E.

Modifier D was a 73.6% ethylene/25% n-butyl acrylate/1.4% glycidyl methacrylate terpolymer.

Modifier E was a 99.5% ethylene/4.5% glycidyl methacrylate copolymer.

In the following examples, two different epoxy functional polymers (EFP) were used:
(1) EFP A was a 73.6% ethylene/25% n-butyl acrylate/1.4% glycidyl methacrylate terpolymer, the same as Modifier D, above.
(2) EFP B was a 99.5% ethylene/4.5% glycidyl methacrylate copolymer, the same as Modifier E, above.

The compositions used in each of the following examples included 0.1% of N,N,-hexamethylene bis(3,5-di-tert-butyl-4-hydroxy-hydrocinnamide) and 0.2% 1,3,5-trimethyl-2,4,6-tris(3,5-di-tert-butyl-4-hydroxybenzyl)-benzene.

In each case the polyamide and the polyarylate were dried overnight in a vacuum oven before the blends were made. The various ingredients were melt blended on a Werner and Pfleider twin screw extruder using the typical configuration as described generally above. The melt strand exiting the extruder was quenched in water and cut into pellets. The pellets were dried overnight in a vacuum oven with a slow nitrogen gas sweep at 120 to 140 degrees C. The dried pellets were injection molded into standard 3.17 mm (⅛ in) test plaques on an injection molding machine with a 6 oz. barrel capacity. Resistance to high speed puncture was determined for each of the samples as described in ASTM D-No. 3763-85 with the following exceptions:

(a) the hole diameter in the clamp assembly described in section 4.1.1 of ASTM D-No. 3763-85 was 39.5 mm (1.56 in), (b) the diameter of the plunger described in section 4.1.2 of ASTM D-No. 3763-85 was 15.7 mm (0.62 in), (c) the samples were run dry as molded, rather than conditioned as described in section 7.1 of ASTM D-No. 3763-85, and (d) the speed of the test as described in section 8 of ASTM D-No. 3763-85 was 288 m/min.

The specific compositions for each of the samples are shown in Table 2 below. In Examples 1–14 and 17 and 18, the modifier was side-fed to the extruder. In Examples 15 and 16 the polyarylate and EFP were side-fed.

TABLE 2

| | | COMPOSITION | | | |
|---|---|---|---|---|---|
| Ex. | Poly-amide (%) | Preblended EFP/Poly-arylate (%) | Poly-arylate (%) | EFP (%) | Modi-fier (%) |
| 1 | 65 A | 25 (7.5/92.5) | — | — | 10 A |
| 2 | 65 A | — | 23.1 | 1.9 A | 10 A |
| 3 | 74 A | 28 (7.5/92.5) | — | — | 2 A |
| 4 | 74 A | — | 25.9 | 2.1 A | 2 A |
| 5 | 58 A | 22 (7.5/92.5) | — | — | 20 A |
| 6 | 58 A | — | 20.4 | 1.6 A | 20 A |
| 7 | 40 A | 50 (7.5/92.5) | — | — | 10 A |
| 8 | 40 A | — | 46.3 | 3.7 A | 10 A |
| 9 | 60 B | 30 (7.5/92.5) | — | — | 10 A |
| 10 | 60 B | — | 27.8 | 2.2 A | 10 A |
| 11 | 65 A | 25 (7.5/92.5) | — | — | 10 A |
| 12 | 65 A | — | 23.1 | 1.9 B | 10 A |
| 13 | 65 A | 25 (15/85) | — | — | 10 A |
| 14 | 65 A | — | 21.3 | 3.7 A | 10 A |
| 15 | 60 A | 30 (7.5/92.5) | — | — | 10 A |
| 16 | 60 A | — | 27.8 | 2.2 A | 10 A |
| 17 | 30 A | 65 (7.5/92.5) | — | — | 5 A |
| 18 | 30 A | — | 60.1 | 4.9 A | 5 A |
| 19 | 62 A | 25 (7.5/92.5) | — | — | 13 B |
| 20 | 62 A | — | 23.1 | 1.9 A | 13 B |
| 21 | 62 A | 25 (7.5/92.5) | — | — | 13 C |
| 22 | 62 A | — | 23.1 | 1.9 A | 13 C |
| 23 | 62 A | 25 (7.5/92.5) | — | — | 5 D |
| 24 | 62 A | — | 23.1 | 1.9 A | 5 D |
| 25 | 62 A | 25 (7.5/92.5) | — | — | 10 D |
| 26 | 62 A | — | 23.1 | 1.9 A | 10 D |
| 27 | 62 A | 25 (7.5/92.5) | — | — | 10 E |
| 28 | 62 A | 25 (7.5/92.5) | 23.1 | 1.9 A | 10 E |

The values for maximum load and energy are given in Table 3 for each of the examples. Values originally obtained in English units have been converted to metric units and rounded where appropriate.

TABLE 3

| | RESISTANCE TO HIGH SPEED PUNCTURE | | |
|---|---|---|---|
| Ex. | Maximum Load (N) | Energy (J) | Specimen Test Temp (°C.) |
| 1 | 7892 | 44 | −20 |
| 2 | 5650 | 27 | −20 |
| 3 | 3980 | 9 | −20 |
| 4 | 2402 | 3 | −20 |
| 5 | 8071 | 56 | −20 |
| 6 | 7165 | 47 | −20 |
| 7 | 5274 | 18 | −20 |
| 8 | 2688 | 3 | −20 |
| 9 | 4754 | 19 | −20 |
| 10 | 4315 | 16 | −20 |
| 11 | 5371 | 18 | −20 |
| 12 | 3252 | 7 | −20 |
| 13 | 7907 | 37 | −20 |
| 14 | 5754 | 14 | −20 |
| 15 | 7854 | 37 | −20 |
| 16 | 3153 | 7 | −20 |
| 17 | 6936 | 36 | 23 |
| 18 | 4867 | 19 | 23 |
| 19 | 7101 | 34 | −20 |
| 20 | 4053 | 11 | −20 |
| 21 | 5155 | 19 | 23 |
| 22 | 4745 | 16 | 23 |
| 23 | 4751 | 19 | 23 |
| 24 | 2441 | 4 | 23 |
| 25 | 7751 | 41 | 0 |
| 26 | 3661 | 7 | 0 |
| 27 | 7724 | 55 | 23 |

In Table 3 above the Examples can be viewed in pairs to show the benefit of premixing EFP and polyarylate. Examples 1–6 demonstrate the use of an elastomeric modifier and its concentration range from a low of 2 weight percent to a maximum of 20 weight percent. Each case demonstrates the effect of premixing the EFP and polyarylate, the quantity of polyamide being varied from as little as 30 weight percent to as much as 74 weight percent, and the quantity of polyarylate being varied from 20 to 60 weight percent. Examples 15 and 16 show that the modifier and the polyamide can be fed into the rear of the extruder and the polyarylate side-fed. The Examples and data presented above clearly demonstrate in a series of side-by-side comparisons the improvement in puncture performance when EFP is preblended with the polyarylate.

We claim:

1. A polyamide/polyarylate composition consisting essentially of:

(a) 25–80 weight percent of at least one polyamide resin, (b) 10–70 weight percent of at least one polyarylate resin, (c) 0.5–30 weight percent of at least one elastomeric modifier which is a graft polymer consisting essentially of at least one monomer containing a functional acid group and at least one substantially saturated copolymer of ethylene and $C_3$–$C_8$ alpha-olefins, and (d) 0.5–7 weight percent of at least one epoxy functional polymer which is a copolymer comprised of at least two of the following monomers:

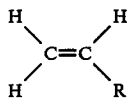

(a)

R = H, lower alkyl, phenyl

-continued

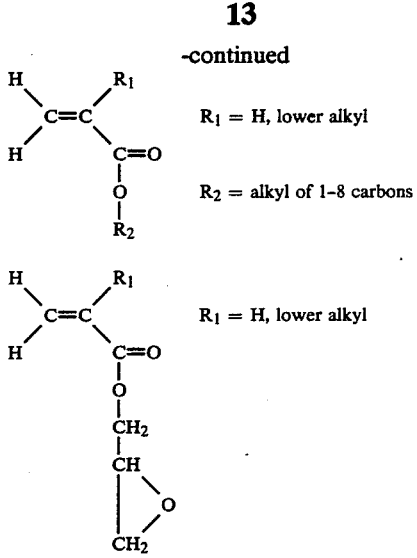

where the monomers of formula (a) comprise 50–99 weight percent of the copolymer, the monomers of formula (b) comprise 0–40 weight percent of the copolymer, and the monomer of formula (c) comprise 1–10 weight percent of the copolymer, wherein the epoxy functional polymer and the polyarylate are blended with each other before either the epoxy functional polymer of the polyarylate are blended with either the polyamide or the elastomeric modifier.

2. The composition of claim 1 wherein the weight percent of component (a) is 30–75.

3. The composition of claim 1 wherein the weight percent of component (a) is 40–75.

4. The composition of claim 1 wherein the weight percent of component (b) is 15–60.

5. The composition of claim 1 wherein the weight percent of component (b) is 20–50.

6. The composition of claim 1 wherein the weight percent of component (c) is 1–25.

7. The composition of claim 1 wherein the weight percent of component (c) is 2–20.

8. The composition of claim 1 wherein the weight percent of component (d) is 1–6.

9. The composition of claim 1 wherein the weight percent of component (d) is 1.5–5.

10. The composition of claim 1 wherein component (a) is selected from 66 nylon, 69 nylon, 610 nylon, 612 nylon, polyamides produced by ring opening of lactams, and copolymers thereof.

11. The composition of claim 10 wherein the polyamide produced by ring opening of a lactam is 6 nylon.

12. The composition of claim 1 wherein component (a) is selected from 66 nylons.

13. The composition of claim 1 wherein component (b) is the reaction product of at least one compound selected from dihydric phenols and derivatives thereof, and at least one compound selected from dicarboxylic acids and derivatives thereof.

14. The composition of claim 1 wherein component (b) is the reaction product of 2,2,-bis(4-hydroxy-phenyl) propane and at least one compound selected from terephthalic acid, isophthalic acid, and derivatives thereof.

15. The composition of claim 14 wherein the ratio of isophthalic acid and derivatives thereof to terephthalic acid and derivatives thereof is 100:0–50:50.

16. The composition of claim 1 wherein component (c) is characterized by having adherent sites, having a tensile modulus in the range of 1–20,000 p.s.i., and having a ratio of tensile modulus of the polyamide to tensile modulus of the modifier of greater than 10 to 1.

17. The composition of claim 1 wherein the at least one monomer containing a functional acid group is selected from unsaturated carboxylic acids, diacids, monoesters of such diacids, and anhydrides.

18. The composition of claim 17 wherein the monomer is fumaric acid, maleic anhydride, maleic acid.

19. The composition of claim 18 wherein the copolymer is derived from ethylene, propylene, and 1,4-hexadiene or the copolymer is derived from ethylene, propylene, 1,4-hexadiene and norbornadiene.

20. The composition of claim 1 wherein the epoxy functional polymer is a copolymer of 65–84 weight percent ethylene, 20–30 weight percent n-butyl acrylate, and 1–5 weight percent glycidyl methacrylate.

21. The composition of claim 19 wherein the epoxy functional polymer is a copolymer of 95–99 weight percent ethylene and 1–5 weight percent glycidyl methacrylate.

* * * * *